US011715826B2

(12) United States Patent
Sawada et al.

(10) Patent No.: US 11,715,826 B2
(45) Date of Patent: Aug. 1, 2023

(54) METHOD FOR PRODUCING ELECTRODE FOR NON-AQUEOUS SECONDARY BATTERY

(71) Applicant: NICHIA CORPORATION, Anan (JP)

(72) Inventors: Shunsuke Sawada, Ramat Gan (IL); Hideyuki Kanechika, Anan (JP); Masahiro Murayama, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/910,715

(22) Filed: Jun. 24, 2020

(65) Prior Publication Data

US 2020/0411857 A1 Dec. 31, 2020

(30) Foreign Application Priority Data

Jun. 25, 2019 (JP) ................................ 2019-117360
Jun. 8, 2020 (JP) ................................ 2020-099295

(51) Int. Cl.

| | |
|---|---|
| ***H01M 4/525*** | (2010.01) |
| ***H01M 4/505*** | (2010.01) |
| ***H01M 4/131*** | (2010.01) |
| ***H01M 4/1391*** | (2010.01) |
| ***H01M 4/134*** | (2010.01) |
| ***H01M 4/1395*** | (2010.01) |
| ***H01M 4/36*** | (2006.01) |
| ***H01M 4/04*** | (2006.01) |
| ***H01M 4/62*** | (2006.01) |
| *H01M 4/02* | (2006.01) |

(52) U.S. Cl.

CPC .......... *H01M 4/525* (2013.01); *H01M 4/043* (2013.01); *H01M 4/0471* (2013.01); *H01M 4/131* (2013.01); *H01M 4/134* (2013.01); *H01M 4/1391* (2013.01); *H01M 4/1395* (2013.01); *H01M 4/364* (2013.01); *H01M 4/505* (2013.01); *H01M 4/621* (2013.01); *H01M 2004/021* (2013.01)

(58) Field of Classification Search

CPC .......... H01M 2004/021; H01M 4/043; H01M 4/0471; H01M 4/131; H01M 4/134; H01M 4/1391; H01M 4/1395; H01M 4/364; H01M 4/505; H01M 4/523; H01M 4/525; H01M 4/621

See application file for complete search history.

(56) References Cited

U.S. PATENT DOCUMENTS

| | | | | |
|---|---|---|---|---|
| 2003/0047717 | A1* | 3/2003 | Kim ................. | H01M 10/0525 252/500 |
| 2003/0124423 | A1* | 7/2003 | Sasaki .............. | H01M 10/0563 429/231.1 |
| 2009/0233176 | A1* | 9/2009 | Kita ..................... | H01M 4/364 429/231.95 |
| 2015/0155555 | A1* | 6/2015 | Yamamoto ........ | H01M 10/0525 429/188 |
| 2016/0351973 | A1* | 12/2016 | Albano .................. | H01M 4/13 |
| 2019/0198874 | A1* | 6/2019 | Sawada ................ | H01M 4/525 |

FOREIGN PATENT DOCUMENTS

| | | | |
|---|---|---|---|
| JP | 2003-292322 | A | 10/2003 |
| JP | 2011-116580 | A | 6/2011 |
| JP | 2013-182757 | A | 9/2013 |
| JP | 2017-202971 | A | 11/2017 |

* cited by examiner

*Primary Examiner* — Sarah A. Slifka
*Assistant Examiner* — Brent C Thomas
(74) *Attorney, Agent, or Firm* — Hunton Andrews Kurth LLP

(57) ABSTRACT

A method for producing an electrode for a non-aqueous secondary battery is provided, the method includes: mixing a compound containing lithium, a compound containing nickel, and barium titanate to obtain a mixture; heat-treating the mixture to obtain a first composition containing a lithium-transition metal composite oxide; preparing an electrode composition containing the first composition, a conductive aid, and a binder; and applying and compressing the electrode composition on a current collector to form an active material layer with a density of from 2.4 g/cm3 to 3.6 g/cm3 on the current collector.

11 Claims, No Drawings

METHOD FOR PRODUCING ELECTRODE FOR NON-AQUEOUS SECONDARY BATTERY

CROSS-REFERENCE TO RELATED APPLICATION

This application claims priority to Japanese Patent Application No. 2019-117360, filed on Jun. 25, 2019 and Japanese Patent Application No. 2020-099295, filed on Jun. 8, 2020 the contents of which are hereby incorporated by reference in their entirety.

BACKGROUND

Technical Field

The present disclosure relates to a method for producing an electrode for a non-aqueous secondary battery.

Description of the Related Art

In a non-aqueous secondary battery, a lithium-transition metal composite oxide is used as a positive electrode active material. As a lithium-transition metal composite oxide, a lithium nickel oxide in which a part of nickel is replaced with cobalt and manganese, namely, a lithium-nickel-cobalt-manganese composite oxide, is being developed. If a battery containing a lithium-nickel-cobalt-manganese composite oxide receives a strong external impact in a charged state, sudden heat can be generated in its positive electrode. This can cause chemical reduction of, for example, nickel, and generate gas by oxygen desorption. Thus, stability of the composite oxide itself is desired. For example, Japanese Patent Application Publication No. 2013-182757 proposes use of a lithium-transition metal composite oxide containing a strontium atom and a titanium atom to improve thermal stability of the positive electrode.

SUMMARY

A first aspect is a method for producing an electrode for a non-aqueous secondary battery including mixing a compound containing lithium, a compound containing nickel, and barium titanate to obtain a mixture, heat-treating the mixture to obtain a first composition containing a lithium-transition metal composite oxide, preparing an electrode composition containing the first composition, a conductive aid, and a binder, and applying and compressing the electrode composition on a current collector to form an active material layer with a density of from 2.4 g/$cm^3$ to 3.6 g/$cm^3$ on the current collector.

A second aspect is an electrode produced by the method for producing an electrode for a non-aqueous secondary battery.

DETAILED DESCRIPTION

As used herein, the term “step” means not only an independent step but also a step which cannot be clearly distinguished from the other steps but that can achieve the desired object. When a plurality of substances corresponding to a component are present in a composition, the amount of the component means the total amount of the corresponding substances present in the composition unless otherwise specified. An average particle diameter of particles is a volume mean diameter, or a median particle diameter, corresponding to 50% volume accumulation from the small particle diameter side in a particle size distribution measured using a laser scattering method. The present invention will now be described in detail by means of embodiments. However, the embodiments shown below are mere examples of the method for producing an electrode for a non-aqueous electrolyte secondary battery for embodying the technical concept of the present invention, and the present invention is not limited to the method for producing an electrode for a non-aqueous electrolyte secondary battery described below.

Method for Producing Electrode for Non-Aqueous Secondary Battery

The method for producing an electrode for a non-aqueous secondary battery may include a mixing step of mixing a compound containing lithium, a compound containing nickel, and barium titanate to obtain a mixture, a heat-treating step of heat-treating the mixture to obtain a first composition containing a lithium-transition metal composite oxide, an electrode composition-preparing step of preparing an electrode composition containing the first composition, a conductive aid, and a binder, and an active material layer-forming step of applying and compressing the electrode composition on a current collector to form an active material layer with a density of from 2.4 g/$cm^3$ to 3.6 g/$cm^3$ on the current collector.

In an embodiment, the electrode is produced by forming an active material layer containing the first composition, which contains a lithium-transition metal composite oxide synthesized in the presence of barium titanate, and having a specific density. A non-aqueous secondary battery including the electrode is superior in safety and cycle characteristics. The first composition, or a positive electrode material for a non-aqueous secondary battery, contains a lithium-transition metal composite oxide that contains titanium or a titanium compound derived from barium titanate (for example, $BaTiO_3$). The lithium-transition metal composite oxide is a main component of the positive electrode material for a non-aqueous secondary battery, and acts, for example, as a positive electrode active material. In the production method according to the present disclosure, a lithium-transition metal composite oxide is synthesized by, for example, co-dispersion of a titanium compound produced by partial thermal decomposition of barium titanate and a lithium compound into the inside of a compound containing nickel. Thus, the titanium component is believed to be solid-solubilized not only in the vicinity of the surfaces but also into the center portions of the particles of the lithium-transition metal composite oxide. Further, the titanium component being solid-solubilized deep into the center portions of the particles allows the titanium component to exert its crystal stabilizing effect more effectively than the case where the titanium component is solid-solubilized only in the vicinity of the surfaces, and this is believed to reduce thermal reduction of nickel contained in the lithium transition metal oxide. Thus, in a secondary battery containing an electrode produced by the method of the present disclosure, the amount of desorbed oxygen gas associated with reduction of nickel in the lithium transition metal oxide when heat is generated in the electrode can be reduced, achieving superior safety. Among the barium titanate not thermally decomposed, and the barium compound and the titanium compound derived from thermal decomposition of barium titanate, the components not solid-solubilized into the lithium-transition metal composite oxide particles are present in the particle boundaries or the surfaces of the lithium-transition metal composite oxide particles, and contribute to the stabilization of the structure in the surfaces and the particle boundaries of the lithium-transition metal composite oxide. Thus, an electrode including the active material layer even with a density in a specific range can contribute to maintain cycle characteristics of the secondary battery including the electrode.

Mixing Step

In the mixing step, a compound containing lithium, a compound containing nickel, and barium titanate are mixed to obtain a mixture containing raw materials for synthesizing a positive electrode material for a non-aqueous secondary battery. Examples of the compound containing lithium include oxides, hydroxides, nitrates, sulfates, and carbonates of lithium. Specific examples of the compound containing lithium include lithium carbonate, lithium nitrate, and lithium hydroxide.

Examples of the compound containing nickel include oxides, hydroxides, nitrates, sulfates, and carbonates of nickel, as well as later-described nickel composite oxides containing nickel and metals other than nickel. The mixture containing raw materials may further contain, for example, oxides, hydroxides, nitrates, sulfates, and carbonates of metals other than nickel. Examples of metals other than nickel include cobalt, titanium, manganese, aluminium, magnesium, tungsten, niobium, zirconium, molybdenum, and tantalum. Examples of the cobalt-containing compound include cobalt oxide, dicobalt trioxide, tricobalt tetroxide, cobalt hydroxide, cobalt nitrate, and cobalt sulfate. Examples of the titanium-containing compound include titanium oxide. Examples of the manganese-containing compound include manganese dioxide, dimanganese trioxide, trimanganese tetroxide, manganese carbonate, manganese nitrate, and manganese sulfate. Examples of the aluminium-containing compound include aluminum oxide, aluminum hydroxide, aluminum nitrate, and aluminum sulfate. Examples of the magnesium-containing compound include magnesium oxide, magnesium hydroxide, magnesium nitrate, and magnesium sulfate. Examples of the tungsten-containing compound include tungsten oxide, lithium tungstate, ammonium tungstate, and organic compounds of tungsten. Examples of the niobium-containing compound include niobium oxide, lithium niobate, and organic compounds of niobium. Examples of the zirconium-containing compound include zirconium fluoride, zirconium chloride, zirconium bromide, zirconium iodide, zirconium oxide, zirconium sulfide, and zirconium carbonate. Examples of the molybdenum-containing compound include molybdenum oxide. Examples of the tantalum-containing compound include tantalum oxide.

When the mixture containing raw materials contains a nickel composite oxide that contains nickel and metals other than nickel as a compound containing nickel, the nickel composite oxide may contain nickel (Ni), cobalt (Co), and at least one element $M^1$ selected from the group consisting of, for example, aluminium (Al), manganese (Mn), and magnesium (Mg). The nickel composite oxide may be specifically prepared in the manner as described below.

First, the compound containing nickel, the cobalt-containing compound, and the compound containing element $M^1$ described above are mixed to prepare a mixed aqueous solution having a desired composition ratio of nickel ions, cobalt ions, and ions of element M'. The prepared mixed aqueous solution and an alkaline solution are contacted to obtain a precipitate containing nickel, cobalt, and $M^1$. Examples of the alkaline solution include aqueous solutions of sodium hydroxide, ammonium hydrogen carbonate, sodium hydrogen carbonate, potassium hydroxide, lithium hydroxide, and combinations thereof.

The resulting precipitate is then washed with water, and heat-treated in an oxygen-containing air flow at from 80° C. to 400° C. with stirring to produce a composite oxide containing nickel, cobalt, and $M^1$. The composite oxide may have a volume mean particle diameter of, for example, from 2 μm to 20 μm, from 3 μm to 20 μm, or from 10 μm to 20 μm. The composite oxide may have a specific surface area of, for example, 10 $m^2/g$ or more, 50 $m^2/g$ or more, or 70 $m^2/g$ or more. The composite oxide may have a specific surface area of, for example, 100 $m^2/g$ or less. Specific surface areas are measured by a gaseous nitrogen adsorption method.

The composite oxide may further contain at least one element $M^2$ selected from the group consisting of zirconium (Zr), tungsten (W), tantalum (Ta), niobium (Nb), and molybdenum (Mo). The composite oxide containing element $M^2$ can be obtained by heat-treating a precipitate precipitated from the mixed aqueous solution further containing ions of element $M^2$ at a desired ratio. The element $M^2$ may be contained in the mixture containing raw materials in the form of a compound containing an element $M^2$ separate from the composite oxide. Further, cobalt, the elements $M^1$ and $M^2$ may be contained in the mixture containing raw materials each in the form of a compound separate from the compound containing nickel. In that case, the mixture containing raw materials may be formed by adding to the compound containing nickel, a cobalt-containing compound, an element $M^1$-containing compound, and an element $M^2$-containing compound in a desired ratio. For the details of the precipitate and composite oxide containing nickel, cobalt, and $M^1$, refer to, for example, Japanese Patent Application Publication Nos. 2003-292322, 2011-116580, and 2017-202971.

The barium titanate contained in the mixture containing raw materials may be a commercially available barium titanate (for example, $BaTiO_3$) as it is, or may be synthesized from a barium source and a titanium source. An example of the barium source is barium carbonate, and an example of the titanium source is titanium oxide. The barium titanate can have a volume mean particle diameter of, for example, from 0.01 μm to 20 μm, from 0.05 μm to 10 μm, or from 0.1 μm to 5 μm.

The mixture containing raw materials may contain barium titanate in an amount of, for example, 0.1 mol % or more, preferably 0.1 mol % or more, 0.3 mol % or more, or 0.5 mol % or more, and, for example, 2 mol % or less, preferably 1.75 mol % or less, or 1.5 mol % or less relative to the compound containing nickel. When the mixture containing raw materials contains barium titanate in an amount of 0.1 mol % or more, the gas generation reduction effect can be sufficiently exhibited. When the amount is 2 mol % or less, lowering of charge-discharge capacity can be sufficiently reduced.

Heat-Treating Step

In the heat-treating step, the mixture containing raw materials is heat-treated to obtain a first composition containing a lithium-transition metal composite oxide. The heat-treating may be carried out in an oxygen atmosphere or in the air.

The heat-treating may be carried out at a temperature in the range of, for example, from 650° C. to 1100° C., and preferably in the range of from 700° C. to 900° C., from 800° C. to 900° C., or from 850° C. to 890° C. Heat-treating at a temperature of 650° C. or more can reduce, for example, the amount of the raw materials partially left unreacted in the positive electrode active material to be produced, lowering of discharge capacity per unit mass, lowering of cycle characteristics, and lowering of operating voltage. Calcination at a temperature of 1100° C. or less can reduce, for example, by-products, lowering of discharge capacity per unit mass, lowering of cycle characteristics, and lowering of operating voltage. The heat-treating time is, for example, 5 hours or more, and preferably 10 hours or more, and, for example, 30 hours or less, and preferably 20 hours or less. A heat-treating time of 5 hours or more sufficiently promotes dispersion reaction among the particles of the mixed raw materials. A heat-treating time of 30 hours or less can have less reduction in productivity.

The heat-treating step may be followed by a pulverizing step of pulverizing the first composition using, for example, a Raikai machine, a ball mill, a vibrational mill, a pin mill, or a jet mill to obtain powder with a target particle size. The resulting first composition (positive electrode material) may have a volume mean particle diameter of, for example, from 2 μm to 20 preferably from 3 μm to 10 μm, or from 4 μm to 8 μm. The first composition (positive electrode material) may have a specific surface area of, for example, from 0.2 $m^2/g$ to 1.5 $m^2/g$, and preferably from 0.3 $m^2/g$ to 0.8 $m^2/g$.

The lithium-transition metal composite oxide contained in the first composition may be a layer-structured composite oxide containing at least lithium and nickel. The lithium-transition metal composite oxide may further contain cobalt, and may still further contain at least one element $M^1$ selected from the group consisting of aluminium, manganese, and magnesium. The lithium-transition metal composite oxide may yet further contain titanium derived from barium titanate. In addition to these, the lithium-transition metal composite oxide may even further contain at least one element $M^2$ selected from the group consisting of zirconium, tungsten, tantalum, niobium, and molybdenum.

The lithium-transition metal composite oxide has a chemical composition with a ratio of the number of moles of nickel to the total number of moles of metals other than lithium of, for example, less than 1. The ratio of the number of moles of nickel in the lithium-transition metal composite oxide to the total number of moles of metals other than lithium in the lithium-transition metal composite oxide may be, for example, from 0.2 or more, or 0.33 or more, preferably 0.4 or more, and more preferably 0.55 or more. The upper limit for the ratio of the number of moles of nickel in the lithium-transition metal composite oxide to the total number of moles of metals other than lithium in the lithium-transition metal composite oxide may be, for example, 0.98 or less, preferably 0.8 or less, and more preferably 0.6 or less. When the chemical composition with a ratio of the number of moles of nickel is in this range, a satisfactory charge-discharge capacity at a high voltage and cycle characteristics can both be achieved in the resulting non-aqueous secondary battery.

When the lithium-transition metal composite oxide contains cobalt, a ratio of the number of moles of cobalt in the lithium-transition metal composite oxide to the total number of moles of metals other than lithium the lithium-transition metal composite oxide may be, for example, 0.02 or more, preferably 0.05 or more, more preferably 0.1 or more, and still more preferably 0.15 or more, and the upper limit may be, for example, less than 1, preferably 0.6 or less, or 0.33 or less, more preferably 0.3 or less, and still more preferably 0.25 or less. When the chemical composition with a ratio of the number of moles of cobalt is in this range, a satisfactory charge-discharge capacity at a high voltage can be achieved in the resulting non-aqueous secondary battery.

When the lithium-transition metal composite oxide contains manganese, a ratio of the number of moles of manganese in the lithium-transition metal composite oxide to the total number of moles of metals other than lithium in the lithium-transition metal composite oxide may be, for example, 0.01 or more, preferably 0.05 or more, more preferably 0.1 or more, and still more preferably 0.15 or more, and the upper limit may be, for example, 0.33 or less, preferably 0.3 or less, and more preferably 0.25 or less. When the chemical composition with a ratio of the number of moles of manganese is in this range, a satisfactory charge-discharge capacity as well as safety can both be achieved in the resulting non-aqueous secondary battery.

When the lithium-transition metal composite oxide contains titanium, a ratio of the number of moles of titanium in the lithium-transition metal composite oxide to the total number of moles of metals other than lithium in the lithium-transition metal composite oxide may be, for example, 0.0001 or more, preferably 0.0002 or more, and more preferably 0.00031 or more, and the upper limit may be, for example, 0.02 or less, and preferably 0.015 or less, or 0.01 or less.

The lithium-transition metal composite oxide may have a chemical composition with a ratio of the number of moles of lithium to the total number of moles of metals other than lithium of, for example, 1.0 or more, preferably 1.03 or more, and more preferably 1.05 or more, and the upper limit may be, for example, 1.5 or less, and preferably 1.25 or less.

When the lithium-transition metal composite oxide contains cobalt and manganese in addition to nickel, the ratio of nickel, cobalt, and manganese may be, for example, nickel:cobalt:manganese=(0.33 to 0.95):(0.02 to 0.33):(0.01 to 0.33), and preferably (0.55 to 0.6):(0.15 to 0.25):(0.15 to 0.3).

The lithium-transition metal composite oxide may be represented by, for example, formula (1):

$$Li_pNi_xCo_yM^1_zTi_vM^2_wO_2 \quad (1)$$

In the formula, p, x, y, z, v, and w satisfy $0.95 \leq p \leq 1.5$, $0<x<1$, $0 \leq y<1$, $0 \leq z \leq 0.35$, $0.0001 \leq v \leq 0.02$, $0 \leq w \leq 0.05$, and $x+y+z+v+w \leq 1$; $M^1$ is at least one selected from the group consisting of Al, Mn, and Mg; and $M^2$ is at least one selected from the group consisting of Zr, W, Ta, Nb, and Mo.

When containing a large amount of lithium, a battery containing the lithium-transition metal composite oxide may have improved output characteristics, but the synthesis of such a lithium-transition metal composite oxide can be difficult. In view of this, the range of value p in composition formula (1) of the lithium-transition metal composite oxide is, for example, $0.95 \leq p \leq 1.5$, preferably $0.98 \leq p \leq 1.25$, and more preferably $1 \leq p \leq 1.15$.

The lithium-transition metal composite oxide contains at least nickel, and preferably further contains cobalt as transition metals. In view of charge-discharge capacity, the ranges of x and y in composition formula (1) of the lithium-transition metal composite oxide may be set to $0<x<1$ and $0 \leq y<1$. When the transition metal composite oxide has a higher composition ratio of nickel, more gas can be generated by nickel reduction, and the effect of barium titanate can be expressed more clearly. Thus, the ranges of x and y are preferably $0.3 \leq x \leq 0.95$ and $0.05 \leq y \leq 0.45$, and more preferably $0.45 \leq x \leq 0.90$ and $0.1 \leq y \leq 0.4$.

The lithium-transition metal composite oxide may further contain at least one element $M^1$ selected from the group consisting of aluminium, manganese, and magnesium. In view of the charge-discharge capacity of a battery to be produced and the structural stability of the lithium transition metal oxide, the range of z in composition formula (1) of the lithium-transition metal composite oxide is, for example, $0 \leq z \leq 0.35$, preferably $0.01 \leq z \leq 0.25$, and more preferably $0.05 \leq z \leq 0.15$.

Although the lithium-transition metal composite oxide can contain at least titanium derived from barium titanate, the lithium-transition metal composite oxide can contain titanium derived from another titanium compound. In view of the crystal structural stability and the charge-discharge capacity, the range of v in composition formula (1) of the lithium-transition metal composite oxide is, for example, $0.0001 \leq v \leq 0.02$, preferably $0.0001 \leq v \leq 0.015$, $0.0002 \leq v \leq 0.015$, and more preferably $0.0003 \leq v \leq 0.015$.

The lithium-transition metal composite oxide may further contain at least one element $M^2$ selected from the group consisting of zirconium, tungsten, tantalum, niobium, and molybdenum. The amount of element $M^2$ can be determined as appropriate considering the properties required of a non-aqueous secondary battery. However, the amount of element $M^2$ is preferably not too much to prevent reduction in battery capacity. In view of this, the range of w in composition formula (1) of the lithium-transition metal composite oxide is, for example, $0 \leq w \leq 0.05$, and preferably $0 \leq w \leq 0.02$ when the balance of various properties is taken into consideration.

Electrode Composition-Preparing Step

In the electrode composition-preparing step, an electrode composition containing the first composition, a conductive aid, and a binder is obtained. The electrode composition can be prepared by, for example, dispersing and dissolving the first composition, a conductive aid, and a binder in a liquid medium.

The amount of the first composition in the electrode composition is, for example, from 70% by mass to 99% by mass, and preferably from 80% by mass to 98% by mass relative to the total solid content of the electrode composition.

Examples of the conductive aid include graphite, such as natural graphite and artificial graphite; carbon blacks, such as acetylene black, Ketjen black, channel black, furnace black, lamp black, and summer black; conductive fibers, such as carbon fibers and metal fibers; carbon materials, such as graphene and carbon nanotubes; carbon fluorides; metal powder, such as aluminum and nickel powder; conductive whiskers, such as zinc oxide and potassium titanate; conductive metal oxides, such as titanium oxide; and conductive materials, such as polyphenylene derivatives. These may be used alone or as a combination of two or more. The amount of the conductive aid in the electrode composition is, for example, from 0.5% by mass to 10% by mass, and preferably from 1% by mass to 5% by mass relative to the total solid of the electrode composition.

The binder helps adhesion between, for example, an electrode active material and a conductive aid, and adhesion of an electrode active material to a current collector. Examples of the binder include polyvinylidene difluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene propylene diene rubber (EPDM), sulfonated EPDM, styrene butylene rubber, fluoro-rubber, and various copolymers. The amount of the binder is, for example, from 0.5% by mass to 25% by mass, and preferably from 1% by mass to 20% by mass relative to the total solid content of the electrode composition.

The electrode composition may contain an organic solvent to serve as a liquid medium. Examples of the organic solvent include N-methyl-2-pyrrolidone (NMP).

The electrode composition may contain a filler as appropriate. The filler reduces, for example, swelling of the electrode active material layer. Examples of the filler include olefin polymers, such as lithium carbonate, polyethylene, and polypropylene; and fibrous materials, such as glass fiber and carbon fiber.

Active Material Layer-Forming Step

In the active material layer-forming step, the electrode composition is applied on a current collector and compressed to form an active material layer with a density of from 2.4 $g/cm^3$ to 3.6 $g/cm^3$ on the current collector. An electrode including the active material layer, which contains an electrode composition containing the first composition and has a specific density, contributes to achieve both superior safety and cycle characteristics in a non-aqueous secondary battery including the electrode.

Examples of the current collector include an aluminum plate or foil. The current collector can have a thickness of, for example, from 3 μm to 500 μm.

The electrode composition may be prepared, for example, in the form of a slurry with fluidity. The prepared slurry may be applied on the current collector, dried, and then compressed using, for example, a roller-press to form an active material layer with a density of from 2.4 $g/cm^3$ to 3.6 $g/cm^3$. Alternatively, the electrode composition may be prepared in the form of a solid, and then compressed to the current collector to form an active material layer with a density of from 2.4 $g/cm^3$ to 3.6 $g/cm^3$. The active material layer may have a density of, for example, from 2.7 $g/cm^3$ to 3.4 $g/cm^3$, or from 2.8 $g/cm^3$ to 3.3 $g/cm^3$. The density of the active material layer is calculated by dividing the mass of the active material layer with the volume of the active material layer.

By forming an active material layer containing the first composition and having a predetermined density on the current collector, an electrode for a non-aqueous secondary battery is produced. A lead is connected to the current collector as appropriate to produce a non-aqueous secondary battery.

A second aspect of the present disclosure is an electrode for a non-aqueous secondary battery produced by the production method described above. In other words, the electrode for a non-aqueous secondary battery includes an active material layer containing a heat-treated product of the mixture containing raw materials containing a lithium compound, a nickel compound, and barium titanate, a conductive aid, and a binder, and having a density of from 2.4 $g/cm^3$ to 3.6 $g/cm^3$, and a current collector supporting the active material layer.

Non-Aqueous Secondary Battery

The non-aqueous secondary battery includes the electrode for a non-aqueous secondary battery to serve as a positive electrode, a negative electrode capable of occluding and releasing lithium, and a non-aqueous electrolyte containing a lithium salt to serve as an electrolyte. The non-aqueous secondary battery may include a separator arranged between the positive electrode and the negative electrode for retaining the non-aqueous electrolyte as appropriate.

A negative electrode typically includes a negative electrode active material layer formed on a negative electrode current collector. Examples of the negative electrode active material include lithium alloys, such as metal lithium and lithium aluminium alloys, and carbon materials capable of occluding and releasing lithium. Typically, carbon materials capable of occluding and releasing lithium are used for their high safety. Examples of the carbon materials to be used for the negative electrode active material include graphite, such as natural graphite and artificial graphite. Besides these carbon materials, a compound capable of occluding and releasing lithium can be used as a negative electrode active material. Examples of such a compound include metal oxides, such as tin oxide, titanium oxide, and silicon oxide.

The compound to be used as an electrolyte is not particularly specified if the compound is not modified or decomposed at operating voltages. The electrolyte may be a non-aqueous electrolyte. Examples of the solvent of the non-aqueous electrolyte include organic solvents, such as dimethoxyethane, diethoxyethane, ethylene carbonate, propylene carbonate, dimethyl carbonate, diethyl carbonate, methyl ethyl carbonate, methyl formate, γ-butyrolactone, 2-methyltetrahydrofuran, dimethyl sulfoxide, and sulfolane. These may be used alone or as a mixture of two or more.

Examples of the lithium salt for the electrolyte include lithium perchlorate, lithium tetrafluoroborate, lithium hexafluorophosphate, and lithium trifluoromethanesulfonate. A solvent and a lithium salt described above are mixed to obtain an electrolyte. To this, for example, a gelling agent may be added to form a gel electrolyte. Alternatively, the electrolyte may be absorbed by a liquid-absorbing polymer to be used as a polymer electrolyte. The amount of the lithium salt in the electrolyte is typically from 0.5 mol/L to 1.5 mol/L. Examples of the separator include porous membranes, such as polyethylene and polypropylene. As a non-aqueous electrolyte, a solid electrolyte with an electrical conductivity of inorganic or organic lithium ions may be used.

The non-aqueous secondary battery is produced by fabricating the above-described positive electrode, a negative electrode, an electrolyte, and a separator, which is used as appropriate, into a suitable shape. Further, other constituent elements, such as an external case may be used as appropriate.

A third aspect of the present disclosure is a method for producing a positive electrode material for a non-aqueous secondary battery. The method for producing a positive electrode material for a non-aqueous secondary battery includes a mixing step of mixing a compound containing lithium, a compound containing nickel, and barium titanate to obtain a mixture, and a heat-treating step of heat-treating the mixture to obtain a positive electrode material containing a lithium-transition metal composite oxide. The details of the mixing step and the heat-treating step are as described previously.

A fourth aspect of the present disclosure is a positive electrode material for a non-aqueous secondary battery produced by the method for producing a positive electrode material for a non-aqueous secondary battery. In other words, the positive electrode material for a non-aqueous secondary battery is a heat-treated product of a mixture containing a lithium compound, a nickel compound, and barium titanate, and is a positive electrode material containing a lithium-transition metal composite oxide.

The positive electrode material for a non-aqueous secondary battery produced by the production method of a positive electrode material for a non-aqueous secondary battery contributes to achieve superior safety when included in a non-aqueous secondary battery.

EXAMPLES

The present invention will now be described more specifically by way of examples; however, the present invention is not limited to these examples. A volume mean diameter is a value corresponding to 50% volume accumulation from the small particle diameter side in a volume distribution obtained using a laser scattering method. Specifically, a laser diffraction particle size dispersion analyzer (Mastersizer 2000 by Malvern) was used to measure volume mean particle diameters. Specific surface areas were measured by the gaseous nitrogen adsorption method (one-point method) using a BET specific surface area measuring device (Macsorb by Mountek).

1. Production of Positive Electrode Material

Example 1

In a reaction vessel, an aqueous solution containing cobalt ions, nickel ions, and manganese ions prepared from nickel sulfate, cobalt sulfate, and manganese sulfate was prepared. The amounts of nickel sulfate, cobalt sulfate and manganese sulfate were adjusted to have a chemical composition with a ratio of the number of moles of cobalt, nickel, and manganese (nickel:cobalt:manganese) of 55:20:25 in the aqueous solution. While the temperature of the aqueous solution was kept at 50° C., an aqueous solution of sodium hydroxide was added dropwise to cause the aqueous solution to have a pH of from 9 to 12. This produced a precipitate containing cobalt, nickel, and manganese. The precipitate was then filtered and washed with water. The water-washed precipitate was heat-treated at 300° C. for 18 hours in an oxygen-containing air flow to obtain a composite oxide containing nickel, cobalt, and manganese ($(Ni_{0.55}Co_{0.2}Mn_{0.25})_3O_4$). The composite oxide had a volume mean particle diameter f 18.5 μm, and a specific surface area of 75 $m^2/g$.

Into the composite oxide, barium titanate ($BaTiO_3$) and lithium carbonate ($Li_2CO_3$) were mixed. The amount of lithium carbonate added was adjusted to have a ratio of the number of moles of lithium to the total number of moles of nickel, cobalt, and manganese of 1.07. The amount of barium titanate to be added was adjusted to 0.5 mol % relative to the composite oxide. The composite oxide, barium titanate, and lithium carbonate were mixed with a mixer to obtain mixed raw materials.

The mixed raw materials were heat-treated at 870° C. for 15 hours in the air. After being heat-treated, the heat-treated product of the mixed raw materials was pulverized, sieved, and classified. Through these steps, a positive electrode material E1 was obtained.

2. Production of Non-Aqueous Secondary Battery

Preparation of Positive Electrode

A positive electrode was prepared using the positive electrode material E1. The positive electrode material E1 in an amount of 92 parts by mass, 3 parts by mass acetylene black, 5 parts by mass polyvinylidene difluoride (PVDF) to serve as a binder were dispersed in N-methyl-2-pyrrolidone (NMP) to prepare a slurry. The slurry was applied on one side of an aluminium foil, dried, and compression-molded using a press to cause the positive electrode active material layer to have a density of 2.8 $g/cm^3$, and then the positive electrode active material layer was cut into a size of 15 $cm^2$ to obtain a positive electrode of Example 1. The density of the positive electrode active material layer was calculated by dividing the mass of the positive electrode active material layer by the volume of the positive electrode active material layer, which was obtained by measuring the thickness of the positive electrode active material layer using a micrometer.

Preparation of Negative Electrode 97.5 parts by mass natural graphite, 1.5 parts by mass carboxymethyl cellulose (CMC) as a binder, and 1.0 part by mass styrene-butadiene rubber (SBR) were dispersed in pure water to prepare a slurry. The slurry was applied to a copper foil, dried, and then compression-molded using a press to cause the negative electrode active material layer to have a density of 1.6 g/cm$^3$, and then the negative electrode active material layer was cut into a size of 16.64 cm$^2$ to obtain a negative electrode.

Preparation of Non-Aqueous Electrolyte

Ethylene carbonate (EC) and methyl ethyl carbonate (MEC) were mixed in a volume ratio of 3:7 to obtain a mixed solvent. To the mixed solvent, lithium hexafluorophosphate ($LiPF_6$) was dissolved to have a concentration of 1 mol/L to prepare a non-aqueous electrolyte.

Fabrication of Battery

To each of the current collectors of the positive electrode and the negative electrode prepared above, a lead electrode was connected, and then vacuum dried at 120° C. The separator described above was arranged between the positive electrode and the negative electrode, all of which were placed into a laminated pouch pack. The pouch pack was then vacuum-dried at 60° C. to remove moisture adsorbed on the members. After the vacuum-drying, an electrolyte was injected into the laminated pouch pack, and the pack was sealed to prepare a laminated non-aqueous secondary battery as a battery for evaluation.

3. Evaluation

Measurement of c-Axis Length and Crystallinity

For the positive electrode material E1, an X-ray diffraction spectrum was obtained using CuKα rays (tube current: 200 mA, tube voltage: 45 kV). A c-axis length was obtained based on the obtained X-ray diffraction spectrum by Rietveld analysis using Rietan 2000 software. In Rietveld analysis, the space group was R3-m, and fitting was carried out to have a value S of 2.1 or less. Crystallinity was calculated by substituting the peak position and the integral width derived from the lattice plane (104) obtained by the X-ray diffraction spectrum into Schemes equation. The results are shown in Table 1.

Gas Desorption Evaluation

For the battery for evaluation, charge and discharge was carried out three times using a charge and discharge tester (TOSCAT-3100 by Toyo System) under the condition of from 2.75 V to 4.3 V. After the charge and discharge, for the non-aqueous secondary battery, constant current/constant voltage charging was carried out to 4.3V at 25° C. for 15 hours at a charging rate of 0.2 C using the charge and discharge tester. The non-aqueous secondary battery was then taken out from the charge and discharge tester, and disassembled in a glove box. The positive electrode was taken out, and partly cut out (5 mg). For the partly cut out positive electrode, the amount of oxygen generated was measured using a temperature programmed gas desorption/photoionization mass spectrometer (TPD type R by Rigaku). The results are shown in Table 1. The amounts of desorbed oxygen shown in Table 1 are relative values when the amount of desorbed oxygen in the positive electrode of Comparative Example 1 is 100.

Battery Life Evaluation

For the battery for evaluation, charge and discharge was carried out three times using the charge and discharge tester (TOSCAT-3100 by Toyo System) under the condition of from 2.75 V to 4.3 V. After the charge and discharge, for the non-aqueous secondary battery, charge and discharge was repeated 400 times at 45° C. under the conditions of a charge and discharge rate of 1 C, an upper limit voltage of 4.3 V, and a lower limit voltage of 2.75 V using the charge and discharge tester. A capacity maintenance rate (%) was obtained by dividing 400$^{th}$ discharge capacity by 1$^{st}$ discharge capacity, and multiplying the quotient by 100. The results are shown in Table 1.

Examples 2 and 3

A positive electrode was each obtained in the same manner as in Example 1 except that the press conditions were changed to cause the active material layer to have a density as shown in Table 1 in preparing a positive electrode. Each resultant positive electrode was evaluated in the same manner as in Example 1. The results are shown in Table 1.

Comparative Example 1

A positive electrode material C1 was obtained in the same manner as in Example 1 except that no barium titanate was added, and that the heat-treating temperature was changed to 895° C. in preparing a positive electrode material. A positive electrode of Comparative Example 1 was obtained in the same manner as in Example 1 except that the resultant positive electrode material C1 was used in the subsequent steps. The resultant positive electrode was evaluated in the same manner as in Example 1. The results are shown in Table 1.

Comparative Examples 2 and 3

A positive electrode was each obtained in the same manner as in Comparative Example 1 except that the press conditions were changed to cause the active material layer to have a density as shown in Table 1 in preparing a positive electrode. Each resultant positive electrode was evaluated in the same manner as in Example 1. The results are shown in Table 1.

Comparative Example 4

A positive electrode material C2 was obtained in the same manner as in Example 1 except that no barium titanate was added, and that the heat-treating temperature was changed to 905° C. in preparing the positive electrode material C2. A positive electrode of Comparative Example 4 was obtained in the same manner as in Example 1 except that the resultant positive electrode material C2 was used in the subsequent steps. The resultant positive electrode was evaluated in the same manner as in Example 1. The results are shown in Table 1.

Comparative Examples 5 and 6

A positive electrode was each obtained in the same manner as in Comparative Example 4 except that the press conditions were changed to cause the active material layer to have a density as shown in Table 1 in preparing a positive electrode. Each resultant positive electrode was evaluated in the same manner as in Example 1. The results are shown in Table 1.

TABLE 1

| | $BaTiO_3$ (mol %) | Heat-treating temperature (° C.) | c-axis length (nm) | Crystallinity | Density ($g/cm^3$) | Amount of desorbed oxygen (%) | Capacity maintenance rate (%) |
|---|---|---|---|---|---|---|---|
| Example 1 | 0.5 | 870 | 1.4239 | 485 | 2.8 | 65 | 78 |
| Example 2 | | | | | 3.1 | 65 | 77 |
| Example 3 | | | | | 3.3 | 65 | 77 |
| Comparative Example 1 | 0 | 895 | 1.4235 | 465 | 2.8 | 100 | 78 |
| Comparative Example 2 | | | | | 3.1 | 100 | 79 |
| Comparative Example 3 | | | | | 3.3 | 100 | 78 |
| Comparative Example 4 | 0 | 905 | 1.4239 | 525 | 2.8 | 78 | 71 |
| Comparative Example 5 | | | | | 3.1 | 78 | 76 |
| Comparative Example 6 | | | | | 3.3 | 78 | 77 |

As shown in Table 1, the non-aqueous secondary batteries of Examples 1 to 3 had a lower amount of oxygen desorption and a higher capacity maintenance rate than the non-aqueous secondary batteries of Comparative Examples 1 to 6, demonstrating that the non-aqueous secondary batteries of Examples 1 to 3 can achieve both safety and satisfactory cycle characteristics. Comparative Examples 1 to 3, where the heat-treating temperature was changed to cause the positive electrode materials to have a crystallinity closer to that of the positive electrode materials of Example 1 to 3, showed a high capacity maintenance rate, but failed to reduce the amount of oxygen desorption, and thus failed to achieve sufficient safety. For the positive electrode materials of Comparative Examples 4 to 6, where the heat-treating temperature was changed to have a higher crystallinity than the positive electrode materials of Examples 1 to 3, failed to reduce the amount of oxygen desorption. The positive electrode active material layer with a specific density had a lower capacity maintenance rate. Thus, the non-aqueous secondary batteries including any one of the positive electrodes of Comparative Examples 4 to 6 were poor in both safety and cycle characteristics.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for producing an electrode for a non-aqueous secondary battery, the method comprising:

preparing a nickel composite oxide containing nickel, cobalt, and at least one element $M^1$ selected from the group consisting of aluminium, manganese, and magnesium;

after the nickel composite oxide containing nickel, cobalt, and the at least one element $M^1$ is prepared, mixing the nickel composite oxide, a compound containing lithium, and $BaTiO_3$ to obtain a mixture, wherein the mixture contains $BaTiO_3$ in an amount of 0.5 mol % or more and 2 mol % or less with respect to the nickel composite oxide;

heat-treating the mixture to obtain a first composition containing a lithium-transition metal composite oxide;

preparing an electrode composition containing the first composition, a conductive aid, and a binder; and applying and compressing the electrode composition on a current collector to form an active material layer with a density of from 2.4 $g/cm^3$ to less than 3.3 $g/cm^3$ on the current collector.

2. The method according to claim 1, wherein the lithium-transition metal composite oxide has a chemical composition with a ratio of a number of moles of nickel to a total number of moles of metals other than lithium of less than 1.

3. The method according to claim 2, wherein the heat-treating is carried out at a temperature of from 700° C. to 900° C.

4. The method according to claim 1, wherein the lithium-transition metal composite oxide further contains cobalt, and wherein a ratio of a number of moles of cobalt in the lithium-transition metal composite oxide to a total number of moles of metals other than lithium in the lithium-transition metal composite oxide is less than 1.

5. The method according to claim 4, wherein the heat-treating is carried out at a temperature of from 700° C. to 900° C.

6. The method according to claim 1, wherein the lithium-transition metal composite oxide further contains at least one selected from the group consisting of aluminium, manganese, and magnesium, and wherein a ratio of a total number of moles of aluminium, manganese, and magnesium in the lithium-transition metal composite oxide to a total number of moles of metals other than lithium in the lithium-transition metal composite oxide is 0.35 or less.

7. The method according to claim 6, wherein the heat-treating is carried out at a temperature of from 700° C. to 900° C.

8. The method according to claim 1, wherein the lithium-transition metal composite oxide has a composition represented by formula (1):

$$Li_pNi_xCo_yM^1_zTi_vM^2_wO_2 \quad (1)$$

wherein $0.95 \leq p \leq 1.5$, $0 < x < 1$, $0 \leq y < 1$, $0 \leq z \leq 0.35$, $0.0001 \leq v \leq 0.02$, $0 \leq w \leq 0.05$, and $x+y+z+v+w \leq 1$; $M^1$ is at least one selected from the group consisting of Al, Mn, and Mg; and $M^2$ is at least one selected from the group consisting of Zr, W, Ta, Nb, and Mo.

9. The method according to claim 8, wherein the heat-treating is carried out at a temperature of from 700° C. to 900° C.

10. The method according to claim 1, wherein the heat-treating is carried out at a temperature of from 700° C. to 900° C.

11. The method according to claim 1, wherein preparing the nickel composite oxide comprises:

preparing a mixed aqueous solution having a desired composition ratio of nickel ions, cobalt ions, and ions of element $M^1$;

contacting the mixed aqueous solution with an alkaline solution to obtain a precipitate containing nickel, cobalt, and $M^1$;

washing the precipitate with water and heat-treating the precipitate to obtain the nickel composite oxide.

* * * * *